United States Patent
Yang et al.

(10) Patent No.: US 11,656,032 B2
(45) Date of Patent: May 23, 2023

(54) HIGH TEMPERATURE FLOW SPLITTING COMPONENT AND HEAT EXCHANGER AND REFORMING MEANS USING THE SAME

(71) Applicant: INDUSTRIAL TECHNOLOGY RESEARCH INSTITUTE, Hsin-Chu (TW)

(72) Inventors: Cheng-Hao Yang, Tainan (TW); Shing-Cheng Chang, Kaohsiung (TW); Yen-Hsin Chan, Taoyuan (TW); Chia-Hsin Lee, Tainan (TW); Wen-Sheng Chang, Hsinchu (TW)

(73) Assignee: INDUSTRIAL TECHNOLOGY RESEARCH INSTITUTE, Hsin-Chu (TW)

(*) Notice: Subject to any disclaimer, the term of this patent is extended or adjusted under 35 U.S.C. 154(b) by 0 days.

(21) Appl. No.: 16/697,305

(22) Filed: Nov. 27, 2019

(65) Prior Publication Data

US 2021/0095927 A1     Apr. 1, 2021

Related U.S. Application Data

(60) Provisional application No. 62/906,764, filed on Sep. 27, 2019.

(30) Foreign Application Priority Data

Nov. 26, 2019    (TW) .................................. 108143022

(51) Int. Cl.
*F28D 9/00*     (2006.01)
*F28D 7/16*     (2006.01)
(Continued)

(52) U.S. Cl.
CPC ....... *F28D 7/1615* (2013.01); *F28D 1/05341* (2013.01)

(58) Field of Classification Search
CPC ............. F28F 2210/02; F28F 2250/102; F28F 2250/104; F28F 13/06; F28F 9/0282;
(Continued)

(56) References Cited

U.S. PATENT DOCUMENTS 4,665,975 A * 5/1987 Johnston ............... F28F 9/0275
                                                   165/167
4,749,032 A * 6/1988 Rosman ................ F28D 9/0018
                                                   165/167
(Continued)

FOREIGN PATENT DOCUMENTS

TW          295638 B      1/1997
TW          580564 B      3/2004
(Continued)

OTHER PUBLICATIONS

Stefano Campanari, Carbon dioxide separation from high temperature fuel cell power plants, Journal of Power Sources, 112, 2002, 273-289.
(Continued)

*Primary Examiner* — Frantz F Jules
*Assistant Examiner* — Jason N Thompson
(74) *Attorney, Agent, or Firm* — Locke Lord LLP; Tim Tingkang Xia, Esq.

(57) ABSTRACT

A high-temperature flow-splitting component, applicable to a temperature range from a first temperature to a second temperature, includes an entrance channel, at least one primary channel and at least one subordinate channel. The entrance channel is used for introducing a fluid at a total flow rate. The at least one primary channel for introducing the fluid from the entrance channel at a first flow rate is
(Continued)

connected with the entrance channel by a first angle ranging from 90°~270°. The at least one subordinate channel for introducing the fluid from the entrance channel at a second flow rate is connected with the at least one primary channel by a second angle ranging from 30°~150°. A sum of the first flow rate and the second flow rate is equal to the total flow rate.

4 Claims, 11 Drawing Sheets

(51) Int. Cl.
*F28F 3/04* (2006.01)
*F28F 13/06* (2006.01)
*F28F 9/02* (2006.01)
*F28D 1/053* (2006.01)

(58) Field of Classification Search
CPC ...... F28F 3/048; F28D 9/0068; F28D 9/0037; F28D 9/005; F28D 7/1615; F28D 7/1623; F28D 7/163; F28D 7/1638
USPC .......................................... 165/100, 101, 139
See application file for complete search history.

(56) References Cited

U.S. PATENT DOCUMENTS

| | | | |
|---|---|---|---|
| 5,309,770 A | | 5/1994 | Okabayashi |
| 5,544,703 A * | | 8/1996 | Joel ..................... F28F 21/02 165/166 |
| 6,637,463 B1 * | | 10/2003 | Lei ....................... B01F 5/0403 137/803 |
| 6,935,416 B1 * | | 8/2005 | Tsunoda ............... F28D 9/0018 165/166 |
| 2002/0080563 A1 * | | 6/2002 | Pence ..................... B01F 25/40 361/677 |
| 2003/0047303 A1 * | | 3/2003 | Andersson ................ F28F 3/10 165/140 |
| 2005/0260472 A1 * | | 11/2005 | Rapaport ................ F28D 9/005 429/514 |
| 2012/0145246 A1 * | | 6/2012 | French .................. F25B 39/028 165/177 |
| 2012/0243180 A1 * | | 9/2012 | Lee .......................... F28F 13/08 361/702 |
| 2016/0109197 A1 * | | 4/2016 | Severson ........... H05K 7/20927 165/71 |
| 2017/0001943 A1 * | | 1/2017 | Gautam ................. B01J 19/245 |
| 2017/0328644 A1 * | | 11/2017 | Takahashi ................ F28F 9/22 |
| 2018/0056265 A1 * | | 3/2018 | Rizzi ........................ F28F 9/18 |
| 2019/0285364 A1 * | | 9/2019 | Streeter .................. B22F 7/062 |

FOREIGN PATENT DOCUMENTS

| | | |
|---|---|---|
| TW | I260103 B | 8/2006 |
| TW | I274856 B | 3/2007 |
| TW | I509871 B | 11/2015 |

OTHER PUBLICATIONS

Vahid Azami et al., Comparison Between Conventional Design and Cathode Gas Recirculation Design of a Direct-Syngas Solid Oxide Fuel Cell Gas Turbine Hybrid Systems Part I: Design Performance, International Journal of Renewable Energy Development, 6, (2), 2017, 127-136.

M. Rajabinasab et al., Effect of recycling solid oxide fuel cell products on the performance of a SOFC-Gas turbine hybrid system, Iranian Journal of Hydrogen and Fuel Cell, 4, 2016, 301-313.

F. Marsano et al., Ejector performance influence on a solid oxide fuel cell anodic recirculation system, Journal of Power Sources, 129, 2004, 216-228.

M.R. Haines et al., Natural Gas Fueled SOFC With Zero CO2 Emissions—System Design and Applications, Proceedings of The Electrochemical Society, 1999, 101-106.

Taiwan Patent Office, "Office Action", dated May 17, 2021, Taiwan.

* cited by examiner

HIGH TEMPERATURE FLOW SPLITTING COMPONENT AND HEAT EXCHANGER AND REFORMING MEANS USING THE SAME

CROSS REFERENCE TO RELATED APPLICATION

This application claims the benefits of U.S. provisional application Ser. No. 62/906,764, filed on Sep. 27, 2019, and also the benefits of Taiwan application Serial No. 108143022, filed on Nov. 26, 2019, the disclosures of which are incorporated by references herein in its entirety.

TECHNICAL FIELD

The present disclosure relates in general to a high-temperature flow-splitting component, and a heat exchange and a reforming means using the high-temperature flow-splitting component, and more particularly to the high-temperature flow-splitting component, and the heat exchange and the reforming means using the same that can control a fluid split percentage effectively under high temperature.

BACKGROUND

In the art, a high-temperature flow-splitting component is usually applied in various fields such as petrochemical, chemical engineering and power industries. Generally, a typical high-temperature fluid splitting means includes a high-temperature flow splitting valve (flow dividing valve), a three-way pipe, etc. For example, in a conventional SOFC (Solid oxide fuel cell) system, the high-temperature fluid splitting means is applied to split the anode exhaust so as to achieve goals in fuel recovery/regeneration and combustion control. Thereupon, systematical power generation efficiency can be remarkably enhanced.

In operation of a typical SOFC system, a fuel gas percentage consumed by the electric stack is about 75%, and the rest 25% would be used for the system to perform thermal circulation. In particular, 25% of the high-temperature tail exhaust gas would affect thermal balance of the system and efficiency of power generation, and thus recycling and heat-exchanging technology applied to the exhaust end of the system is extremely important.

Currently, the fuel-splitting technology for conventional SOFC systems usually adopts vacuum pumps or active/passive splitting valves.

Regarding the vacuum pumps, since a typical normal pump cannot be operated normally under high temperature (for example, >400° C.), thus a special temperature-resistant pump shall be applied to the aforesaid fuel-splitting technology. However, a price of the temperature-resistant pump is usually three times the price of the normal pump. Alternatively, if only the normal pump can be used, additional heat exchanger is needed for reducing the temperature of the tail exhaust gas, and thus associated heat loss would be increased.

Regarding the active/passive splitting valves, the active splitting valve is featuring in a higher price and frail electronic components unable to withstand high temperatures, and, on the other hand, the passive splitting valve is unable to control the split percentage.

According to the aforesaid shortcomings that the conventional flow-splitting technology is unable to be accurately operated to control the split percentage of the exhaust gas under high temperature, and that the production cost is high, thus an improved high-temperature flow-splitting component that can control the fluid split percentage effectively under high temperature is definitely urgent and welcome to the skill in the art.

SUMMARY

In one embodiment of this disclosure, a high-temperature flow-splitting component, applicable to operate under a temperature range between a first temperature and a second temperature, the first temperature being less than the second temperature, includes:

an entrance channel, used for introducing a fluid at a total flow rate;

at least one primary channel, connected with the entrance channel, forming a first angle with the entrance channel, the first angle ranging from 90°~270°, introducing the fluid from the entrance channel at a first flow rate; and at least one subordinate channel, connected with the at least one primary channel, forming a second angle with the at least one primary channel, the second angle ranging from 30°~150°, introducing the fluid from the entrance channel at a second flow rate; wherein a sum of the first flow rate and the second flow rate is equal to the total flow rate.

In another embodiment of this disclosure, a heat exchanger includes at least one channel plate. The channel plate has two opposing sides to be furnished respectively with a plurality of first fluid channels and a plurality of second fluid channels, a first fluid and a second fluid are to flow respectively through the plurality of first fluid channels and the plurality of second fluid channels, and the first fluid and the second fluid have different temperatures. Preferably, the at least one first fluid channel applies the high-temperature flow-splitting component as stated above.

In a further embodiment of this disclosure, a reforming mechanism applying the aforesaid high-temperature flow-splitting component includes a reforming catalyst coating on the high-temperature flow-splitting component for performing a reforming reaction.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
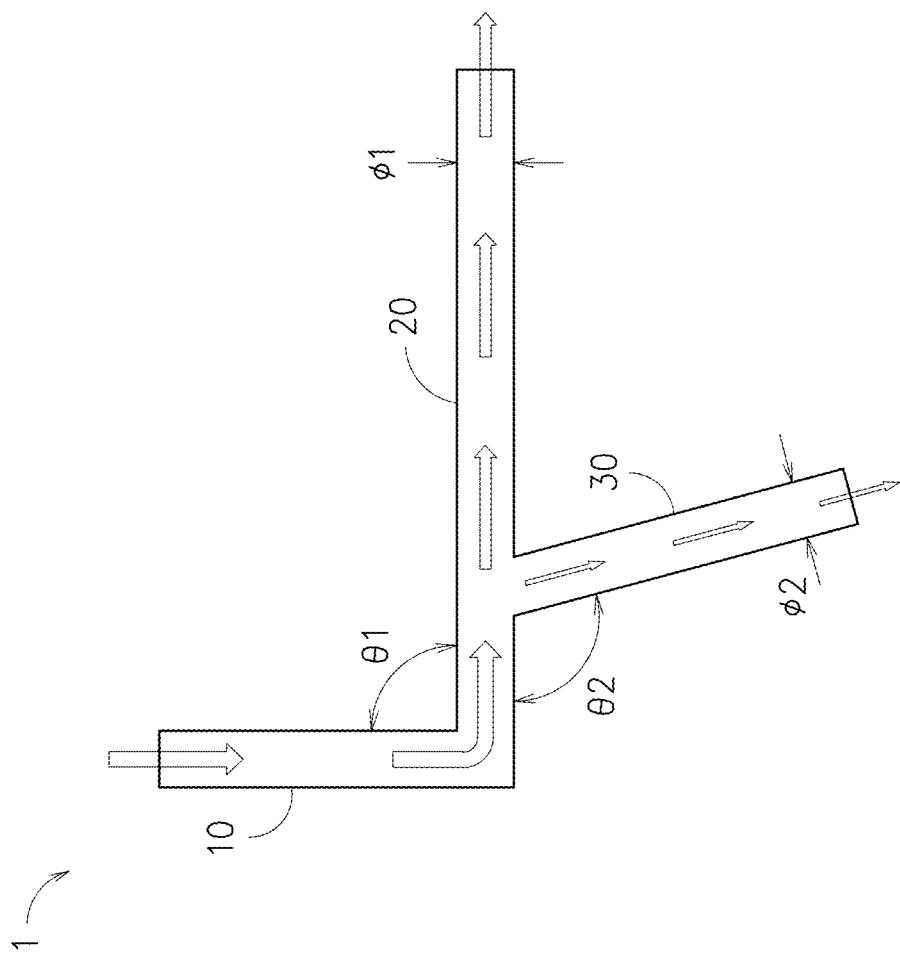
FIG. 1 is a schematic view of an embodiment of the high-temperature flow-splitting component in accordance with this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Referring to FIG. 1, a schematic view of an embodiment of the high-temperature flow-splitting component 1 in accordance with this disclosure is shown. The high-temperature flow-splitting component 1 is applicable to operate under a temperature range between a first temperature and a second temperature, in which the first temperature is smaller than the second temperature. In this embodiment, the high-temperature flow-splitting component 1 includes an entrance channel 10, a primary channel 20 and a subordinate channel 30.

The entrance channel 10 is used for introducing a fluid at a total flow rate. The primary channel 20 is connected with the entrance channel 10, and forms therewith a first angle θ1, in which the first angle θ1 is ranging from 90°~270°. The primary channel 20 is introduced with the fluid from the entrance channel 10 at a first flow rate.

The subordinate channel 30 is connected with the primary channel 20, and forms therewith a second angle θ2, in which the second angle θ2 is ranging from 30°~150°. The subordinate channel 30 is also introduced with the fluid from the entrance channel 10 at a second flow rate. In addition, a sum of the first flow rate and the second flow rate is a total flow rate.

The primary channel 20 has a first diameter ψ1, the subordinate channel 30 has a second diameter ψ2, and a ratio of the second diameter ψ2 to the first diameter ψ1 is preferred to be (ψ2/ψ1)=0.25~1.1.

When the high-temperature flow-splitting component 1 is operated at a first temperature, the second flow rate in the subordinate channel 30 is less than 5% of the total flow rate. For example, in the case that the first temperature is 25° C., the first flow rate of the primary channel 20 is 99% of the total flow rate, while the subordinate channel 30 shares the other 1% of the total flow rate.

When the high-temperature flow-splitting component 1 is operated at a second temperature, the second flow rate in the subordinate channel 30 is equal to or larger than 5% of the total flow rate. For example, in the case that the second temperature is 800° C., the first flow rate of the primary channel 20 is 54% of the total flow rate, while the subordinate channel 30 shares the other 46% of the total flow rate.

Figure 2:
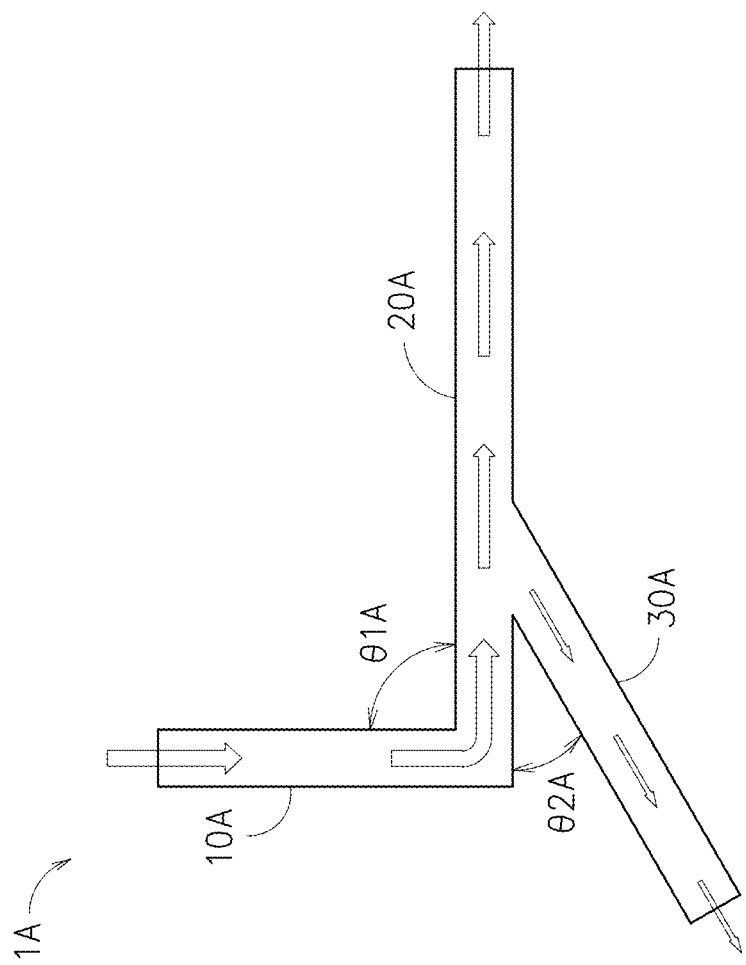
FIG. 2 is a schematic view of another embodiment of the high-temperature flow-splitting component in accordance with this disclosure.

Referring to the embodiment shown in FIG. 2, the high-temperature flow-splitting component 1A includes an entrance channel 10A, a primary channel 20A and a subordinate channel 30A. The primary channel 20A and the entrance channel 10A are connected to form a first angle θ1A equal to 90°. The subordinate channel 30A and the primary channel 20A are connected to form a second angle θ2A equal to 30°.

Figure 3:
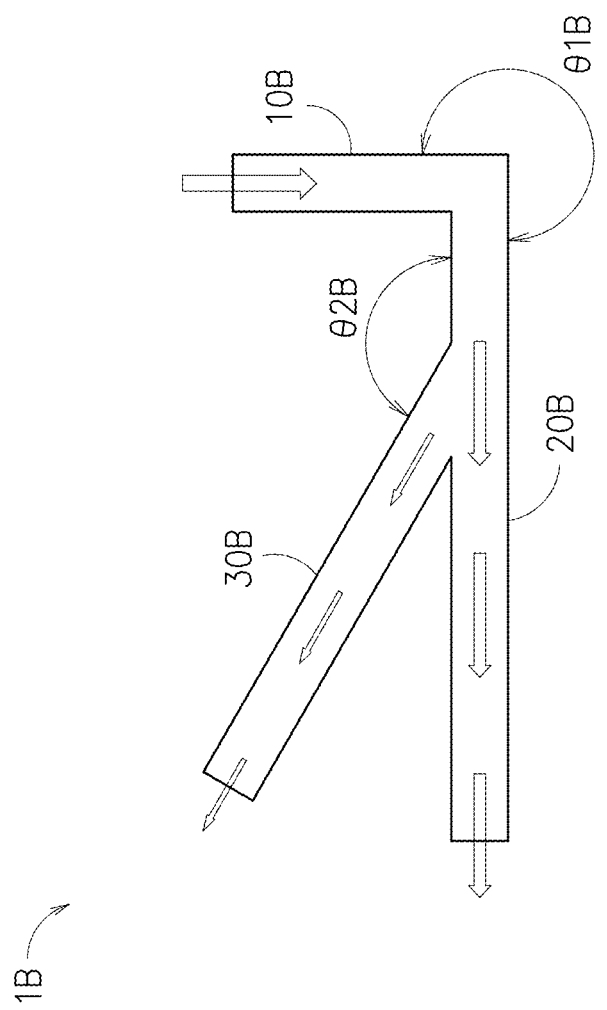
FIG. 3 is a schematic view of a further embodiment of the high-temperature flow-splitting component in accordance with this disclosure.

Referring to the embodiment shown in FIG. 3, the high-temperature flow-splitting component 1B includes an entrance channel 10B, a primary channel 20B and a subordinate channel 30B. The primary channel 20B and the entrance channel 10B are connected to form a first angle θ1B equal to 90°. The subordinate channel 30B and the primary channel 20B are connected to form a second angle θ2B equal to 150°.

Figure 4:
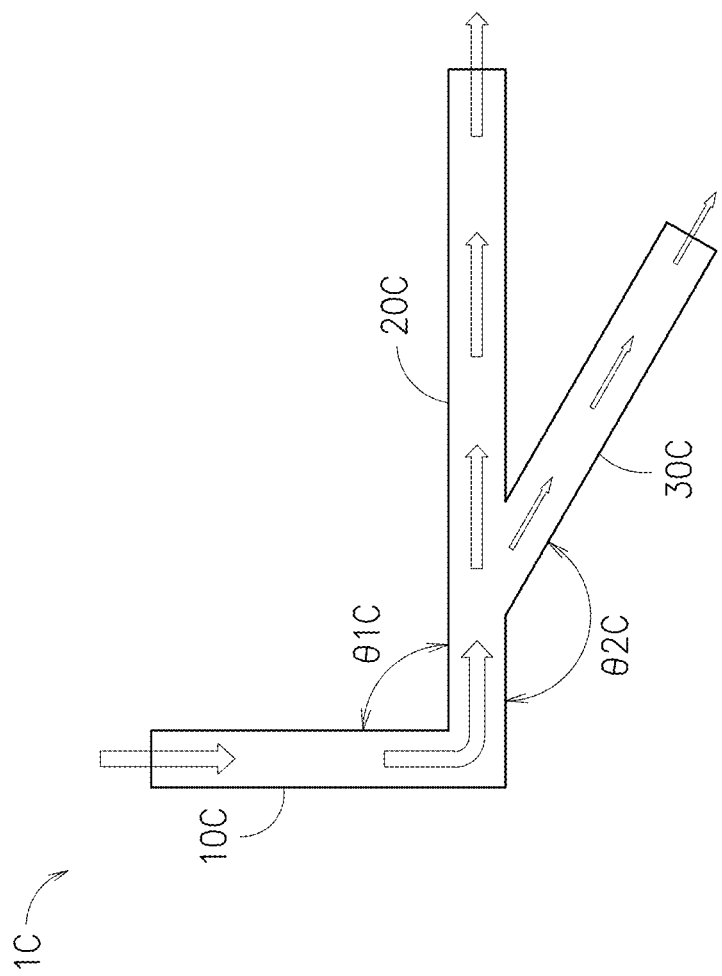
FIG. 4 is a schematic view of one more embodiment of the high-temperature flow-splitting component in accordance with this disclosure.

Referring to the embodiment shown in FIG. 4, the high-temperature flow-splitting component 1C includes an entrance channel 10C, a primary channel 20C and a subordinate channel 30C. The primary channel 20C and the entrance channel 10C are connected to form a first angle θ1C equal to 270°. The subordinate channel 30C and the primary channel 20C are connected to form a second angle θ2C equal to 150°.

Though FIG. 2 through FIG. 4 provide different angular formulations among the entrance channel, the primary channel and the subordinate channel, yet appropriate angling there-among according to this disclosure shall be determined per practical requirements.

Figure 5:
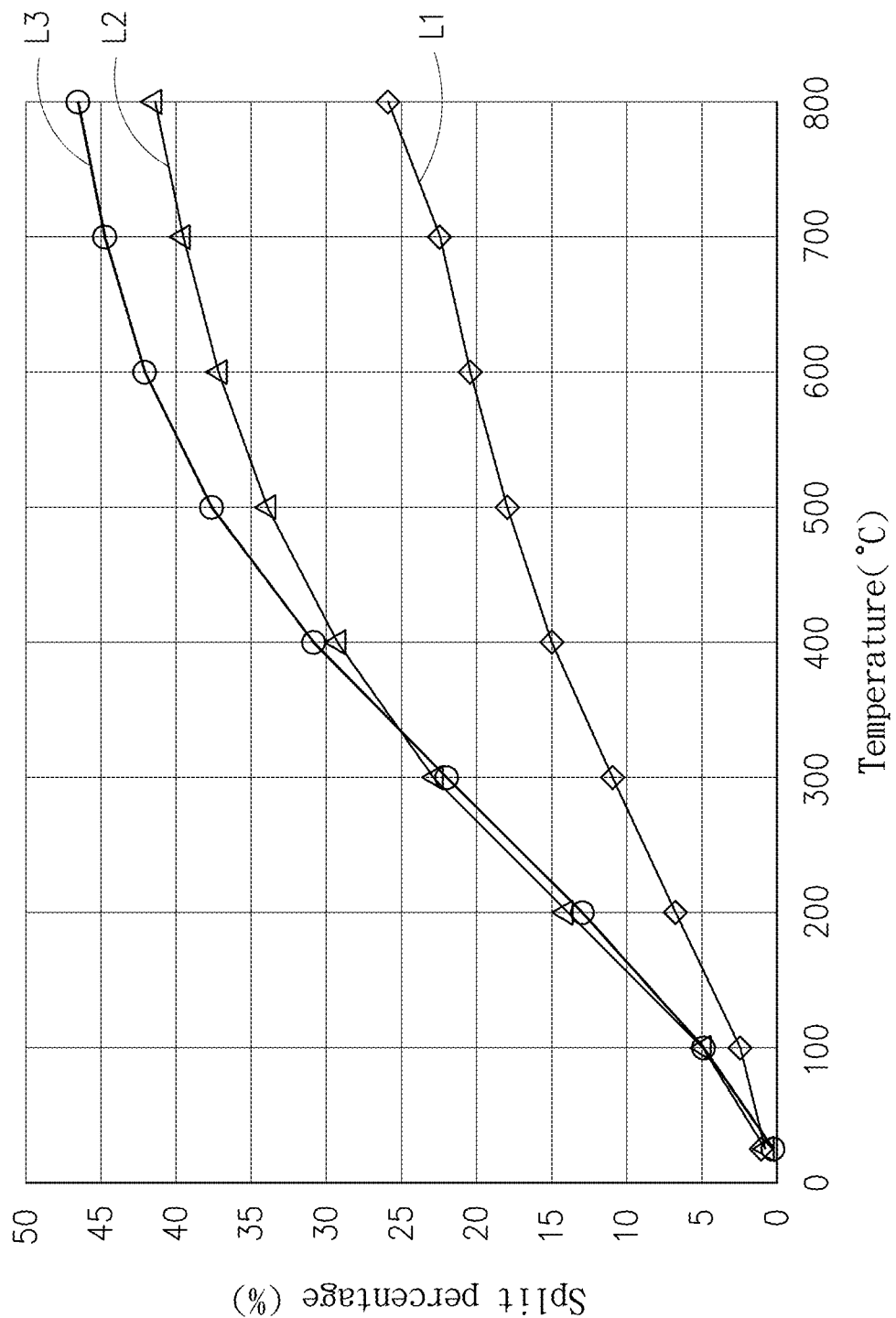
FIG. 5 shows schematically curves of split percentages while using the high-temperature flow-splitting component at different work temperatures in accordance with this disclosure.

Referring to FIG. 5, the vertical axis stands for the split ratio in percentage (i.e., the split percentage), which is defined as the percentage of the second flow rate of the subordinate channel in the total flow rate of the entrance channel.

In FIG. 5, curve L1 is referred to the embodiment shown in FIG. 2. In this embodiment, the first angle θ1A is 90°, the second angle θ2A is 30°, and the fluid flow rate for testing is set to be 8 l/min. When the high-temperature flow-splitting component 1A is operated under 25° C., the second flow rate would be about 1% of the fluid total flow rate. On the other hand, as the high-temperature flow-splitting component 1A is operated under 800° C., the second flow rate would reach 26% of the fluid total flow rate.

In FIG. 5, curve L2 is referred to the embodiment shown in FIG. 3. In this embodiment, the first angle θ1B is 270°, the second angle θ2B is 150°, and the fluid flow rate for testing is set to be 5.6 l/min. When the high-temperature flow-splitting component 1B is operated under 25° C., the second flow rate would be about 1% of the fluid total flow rate. On the other hand, as the high-temperature flow-splitting component 1B is operated under 800° C., the second flow rate would reach 42% of the fluid total flow rate.

In FIG. 5, curve L3 is referred to the embodiment shown in FIG. 4. In this embodiment, the first angle θ1C is 90°, the second angle θ2C is 150°, and the fluid flow rate for testing is set to be 8.4 l/min. When the high-temperature flow-splitting component 1C is operated under 25° C., the second flow rate would be about 1% of the fluid total flow rate. On the other hand, as the high-temperature flow-splitting component 1C is operated under 800° C., the second flow rate would reach 47% of the fluid total flow rate.

As shown in FIG. 5, with the first angle θ1 between the primary channel 20 and the entrance channel 10 of the high-temperature flow-splitting component 1 to be within 90°~270°, and with the second angle θ2 between the subordinate channel 30 and the primary channel 20 thereof to be within 30°~150°, it is proved that flow-splitting performance of the high-temperature flow-splitting component 1 at a higher temperature such as 800° C. is more remarkable than that thereof at 25° C.

Figure 5A:
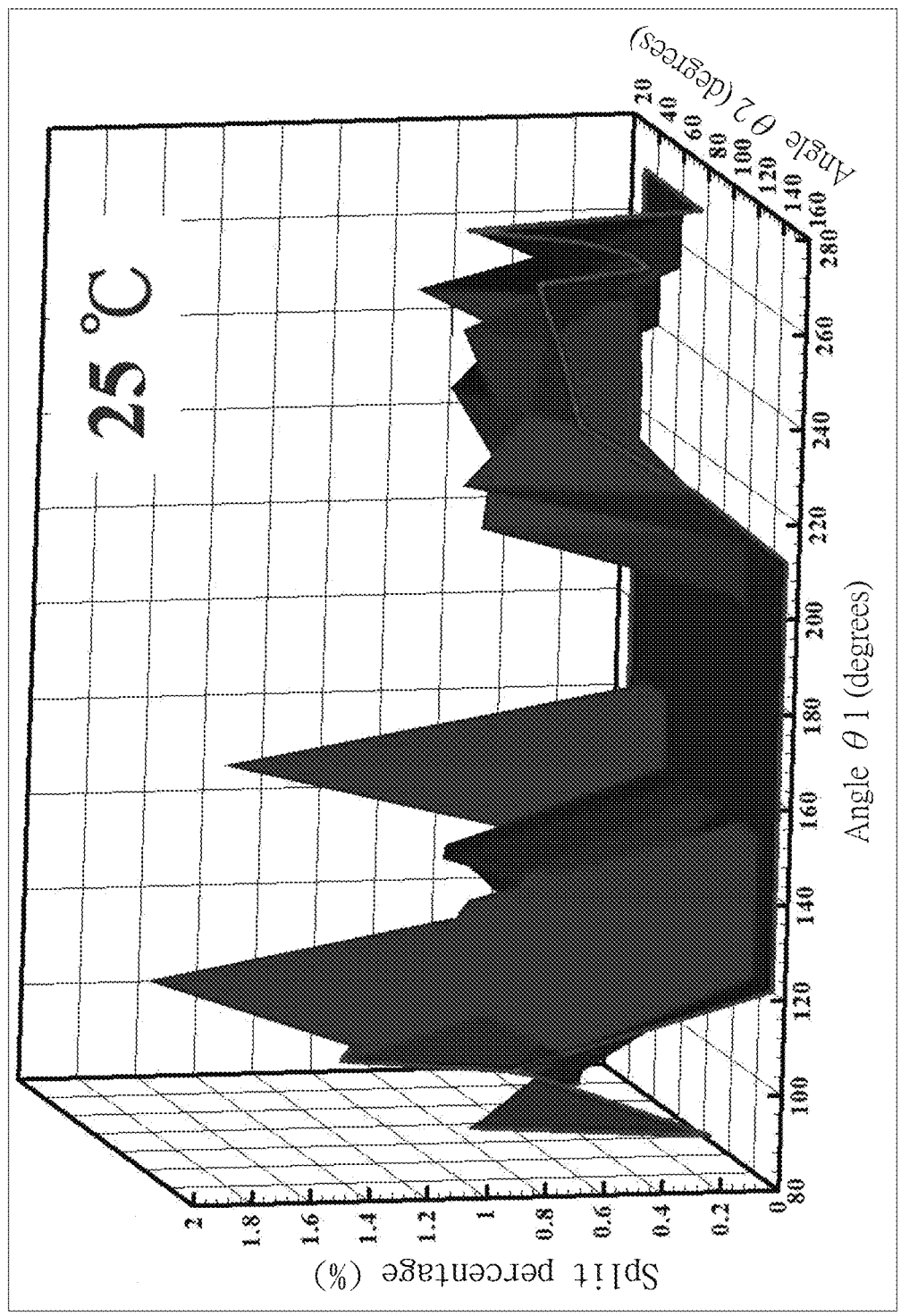
FIG. 5A demonstrates three-dimensional relationships between angles of the high-temperature flow-splitting component and spilt percentages while using the high-temperature flow-splitting component at 25° C. in accordance with this disclosure.

Referring to FIG. 5A, three-dimensional relationships between angles and split percentages of the high-temperature flow-splitting component at 25° C. in accordance with this disclosure are demonstrated, in which "Split percentage (%)" stands for the split ratio in percentage of the flow introduced into the subordinate channel to that introduced into the entrance channel, "Angle θ1 (degrees)" stands for the first angle between the primary channel and the entrance channel, and "Angle θ2 (degrees)" stands for the second angle between the subordinate channel and the primary channel.

Figure 5B:
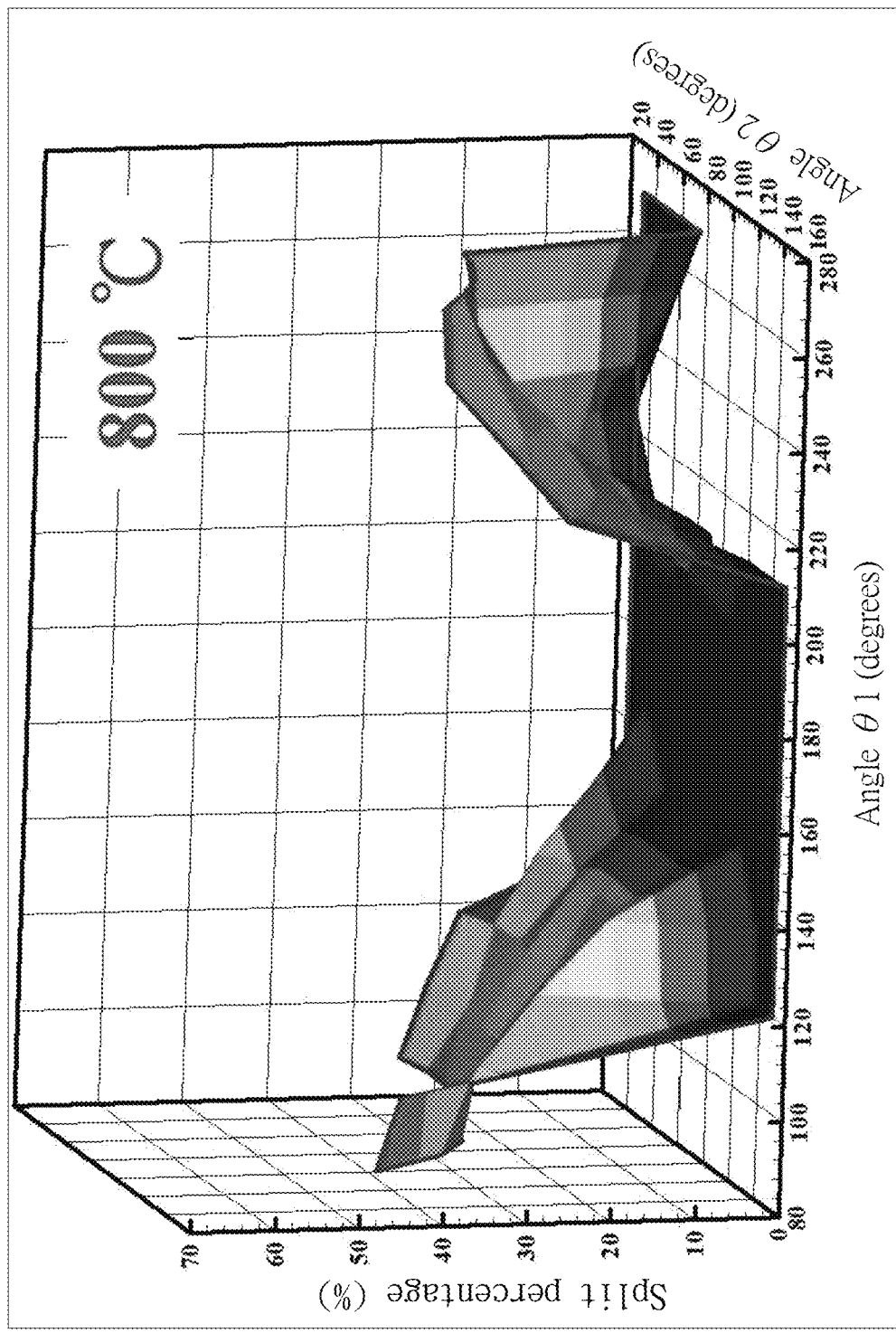
FIG. 5B demonstrates three-dimensional relationships between angles of the high-temperature flow-splitting component and spilt percentages while using the high-temperature flow-splitting component at 800° C. in accordance with this disclosure.

Referring to FIG. 5B, three-dimensional relationships between angles and split percentages of the high-temperature flow-splitting component at 800° C. in accordance with this disclosure are demonstrated, in which "Split percentage (%)" stands for the split ratio in percentage of the flow introduced into the subordinate channel to that introduced into the entrance channel, "Angle θ1 (degrees)" stands for the first angle between the primary channel and the entrance channel, and "Angle θ2 (degrees)" stands for the second angle between the subordinate channel and the primary channel. In this embodiment, the fluid is Hydrogen ($H_2$).

Figure 5C:
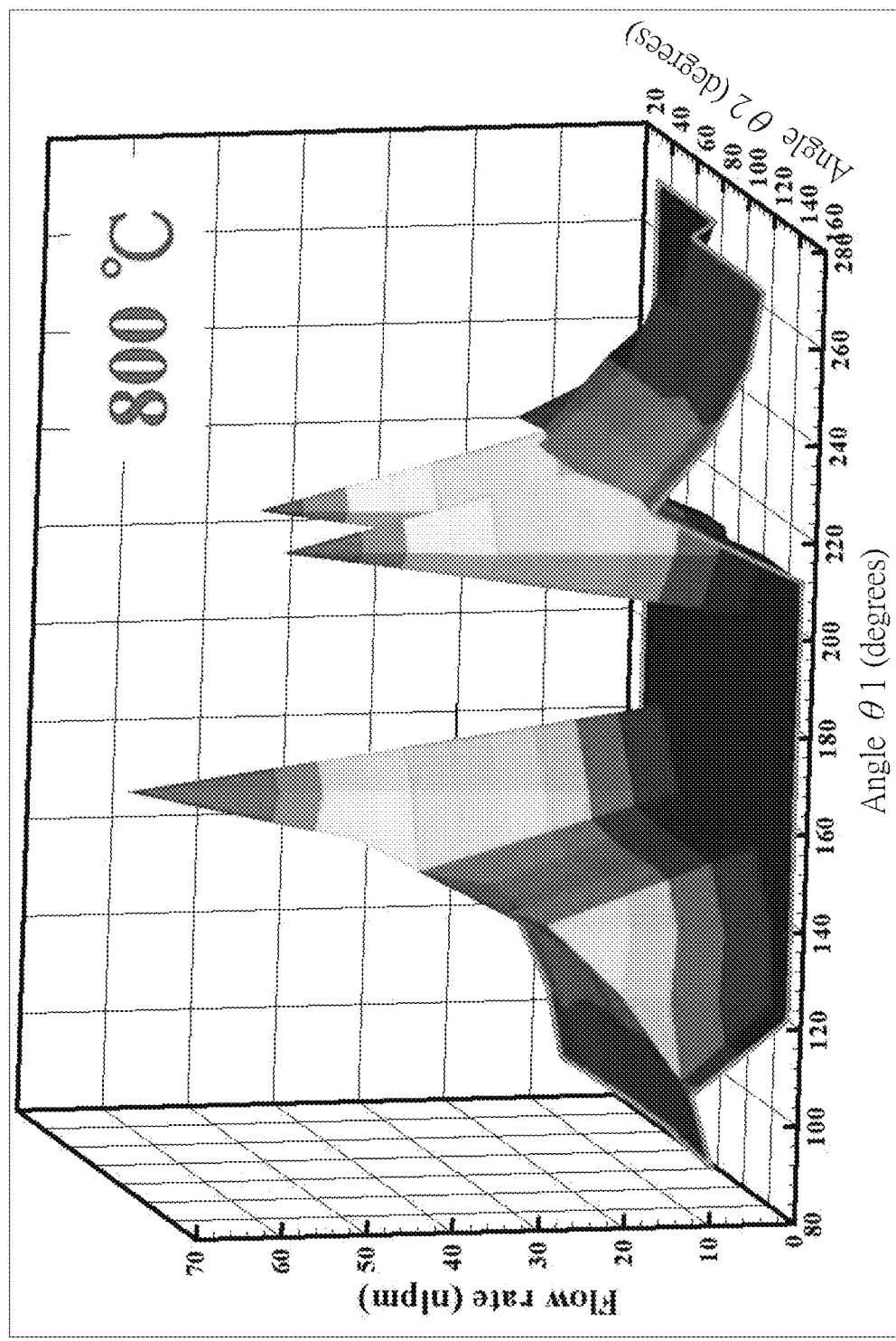
FIG. 5C demonstrates three-dimensional relationships between angles of the high-temperature flow-splitting component and flow rates while using the high-temperature flow-splitting component at 800° C. in accordance with this disclosure.

Referring to FIG. 5C, three-dimensional relationships between angles and flow rates of the high-temperature flow-splitting component at 800° C. in accordance with this disclosure are demonstrated, in which "Flow rate (nlpm)" stands for the fluid flow rate (nlpm) of the entrance channel, "Angle θ1 (degrees)" stands for the first angle between the primary channel and the entrance channel, and "Angle θ2 (degrees)" stands for the second angle between the subordinate channel and the primary channel.

According to FIG. 5A~5C, it is obvious that most of the split percentages at 25° C. are less than or equal to 1%, but the split percentage at 800° C. for the first angle ranging from 90°~270° and the second angle ranging from 30°~150° can be up to 46%. Through arranging appropriately the first angle and the second angle, with the flow rate of Hydrogen ranging from 5~65 nlpm, different flow-splitting mechanisms for room and high temperatures (25° C. and 800° C.), respectively, can be provided. According to the aforesaid results, the flow-splitting component of this disclosure can control effectively the split flows at high or low temperature.

Figure 6:
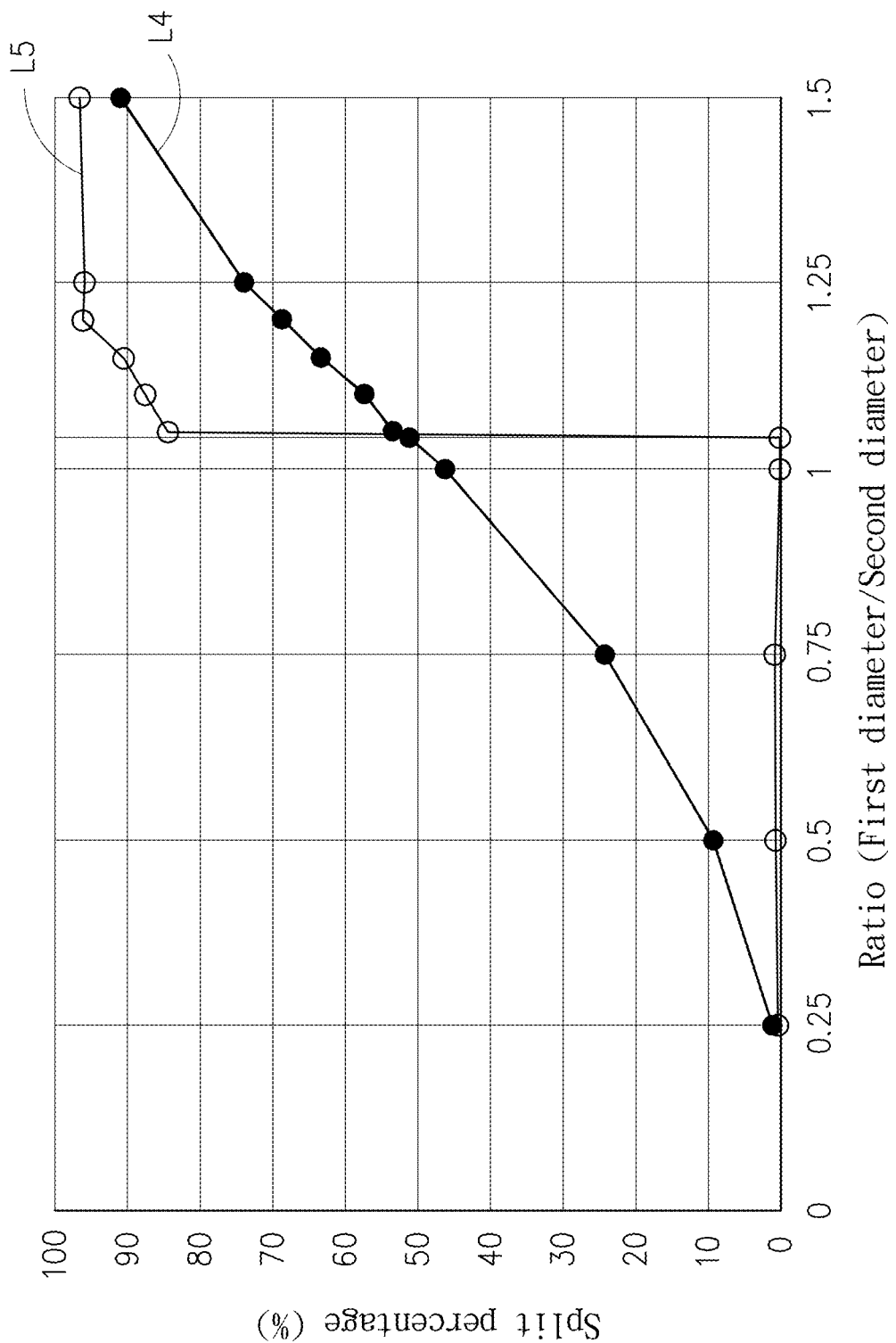
FIG. 6 shows schematically curves of split percentages while using the high-temperature flow-splitting component with different pipe diameters of the primary channel and the subordinate channel in accordance with this disclosure.

Refer to FIG. 1 and FIG. 6. In FIG. 6, the vertical axis stands for a split percentage of the second flow rate of the subordinate channel 30 in the total flow rate of the entrance channel 10, and the horizontal axis stands for a ratio of the second diameter ψ2 to the first diameter ψ1.

In FIG. 6, curve L4 demonstrates variations in the split percentages at 800° C. with respect to the corresponding ratios of the second diameter ψ2 to the first diameter ψ1 while in applying the high-temperature flow-splitting component 1.

On the other hand, in FIG. 6, curve L5 demonstrates variations in the split percentages at 25° C. with respect to the corresponding ratios of the second diameter ψ2 to the first diameter ψ1 while in applying the high-temperature flow-splitting component 1.

From FIG. 6, it is obvious that, when the diameter ratio ψ2/ψ1 is within 0.25~1.1, flow splitting of the high-temperature flow-splitting component 1 operated at high temperature is much more significant than that at room temperature. Namely, this disclosure can perform effective flow-splitting control via the fluid temperature.

Figure 7:
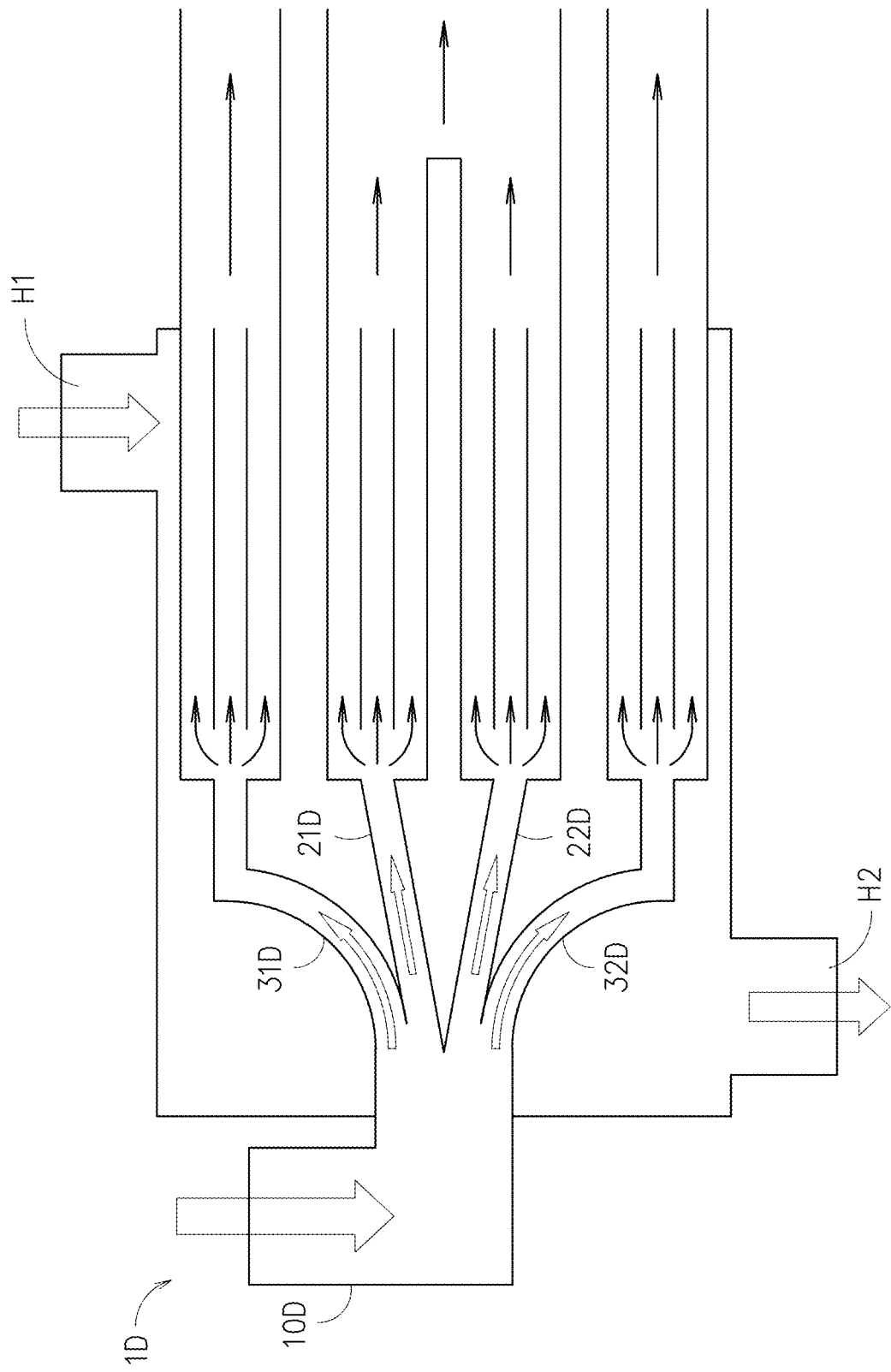
FIG. 7 is a schematic view of an embodiment of the high-temperature flow-splitting component having a plurality of primary channels and a plurality of subordinate channels in accordance with this disclosure.

Referring to the embodiment shown in FIG. 7, the high-temperature flow-splitting component 1D includes an entrance channel 10, a plurality of primary channels 21D, 22D and a plurality of subordinate channels 31D, 32D. Definitions of angling and diameter percentages among the entrance channel 10, the primary channels 21D, 22D and the subordinate channels 31D, 32D in this embodiment are resembled to those provided by the aforesaid embodiment shown in FIG. 1. In addition, in FIG. 7, H1 and H2 stand for an entrance and an exit of the high-temperature fluid introduced to pass through the high-temperature flow-splitting component 1D of this disclosure. By providing the high-temperature flow-splitting component 1D in accordance with this disclosure, heat exchange upon the high-temperature fluid can be used to control the split percentage.

According to this disclosure, numbers and shapes of the primary channels and the subordinate channels in FIG. 7 can be determined per practical requirements.

Figure 8B:
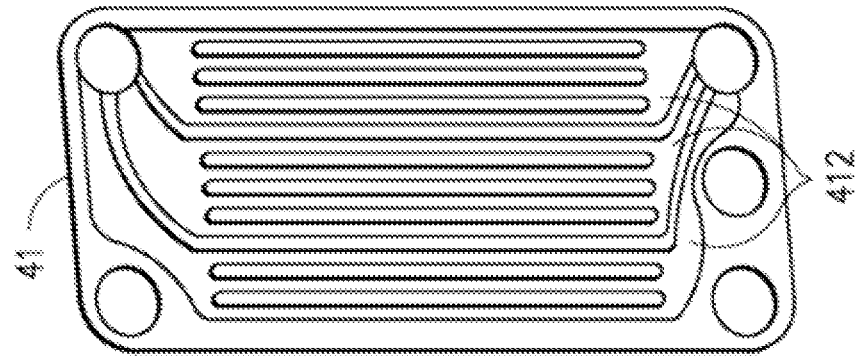
FIG. 8A and FIG. 8B show schematically and individually two opposing sides of the channel plate of the heat exchanger of FIG. 8.
Figure 8A:
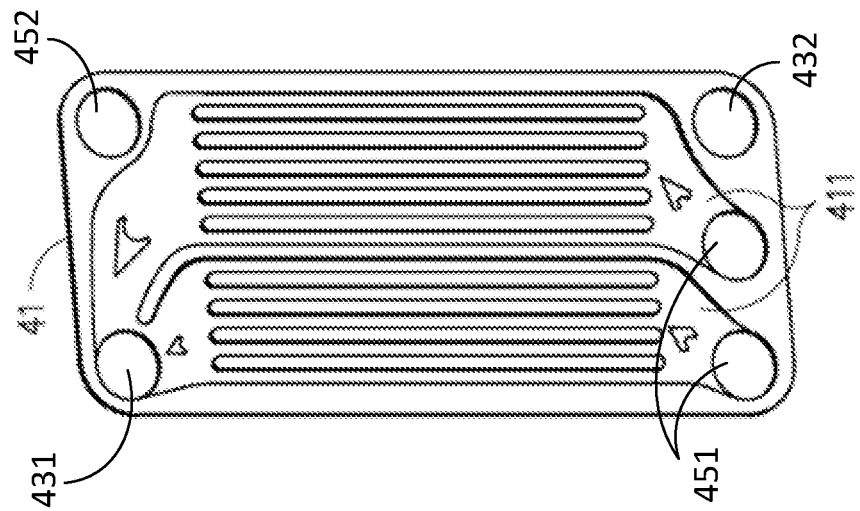
Figure 8:
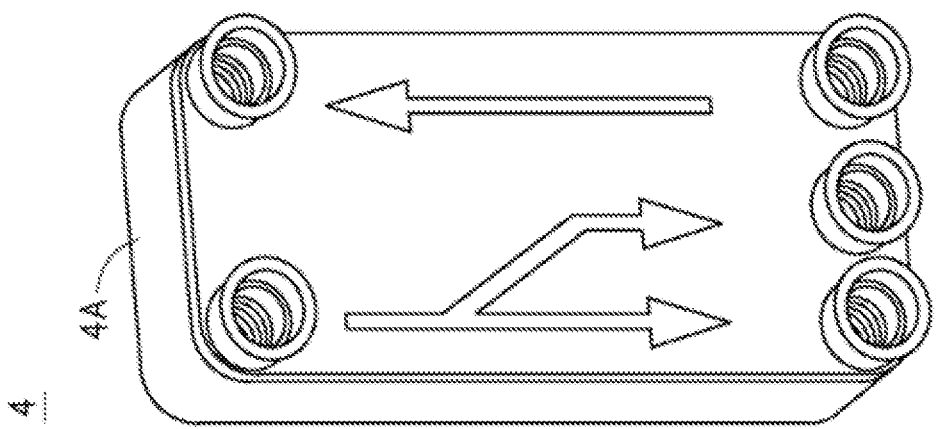
FIG. 8 is a schematic perspective view of an appearance of an embodiment of the heat exchanger using the high-temperature flow-splitting component in accordance with this disclosure.

Referring to FIG. 8, a heat exchanger 4 provided by this disclosure has a channel plate assembly 4A. The channel plate assembly 4A is formed by stacking a plurality of channel plates 41. According to this disclosure, the heat exchanger 4 can be applied to any device that needs to be heat exchanged, such as the SOFC.

Referring to FIG. 8A and FIG. 8B, opposing sides of the same channel plate 41 are shown, respectively. These two opposing sides are individually furnished with a plurality of first fluid channels 411 and second fluid channels 412, respectively. The first fluid channel 411 and the second fluid channel 412 are provided for passing through a first fluid and a second fluid having different temperatures, respectively. Angling arrangement for the first fluid channel 411 can be referred to the aforesaid disclosure for the entrance channel, the primary channel and the subordinate channel of foregoing embodiments of the high-temperature flow-splitting component. In addition, each channel plate 41 is provided with a plurality of entrance holes and a plurality of exit holes. Specifically, the entrance holes include a first entrance hole 431 and a second entrance hole 432, and the exit holes include two first exit holes 451 and a second exit hole 452.

As shown in FIG. 8A, the first fluid can be introduced to pass through the first fluid channels 411 of the channel plate 41, including both the primary channels and the subordinate channels, via the entrance hole. In other words, the first fluid enters the channel plate 41 via the first entrance hole 431, is then bifurcated into the primary channels and the subordinate channels (arrow direction shown at the left-hand side of FIG. 8), and finally flows out of the channel plate 41 via two first exit holes 451. On the other hand, the second fluid, having a temperature different to the temperature of the first fluid, is introduced to pass through the second fluid channels 412 of the second fluid (arrow direction shown at the right-hand side of FIG. 8) via the second entrance hole 432 located oppositely diagonally to the aforesaid first entrance hole 431, and then leaves the channel plate 41 via the second exit hole 452 located oppositely diagonally to the aforesaid first exit holes 451. By arranging the first fluid and the second fluid with different temperatures to flow on the two opposing sides of the same channel plate 41 in opposing directions, and by providing the first fluid channels 411 according to the previous design concept for the high-temperature flow-splitting component of this disclosure, the split percentage of the flow can be effectively controlled.

It shall be explained that the aforesaid heat exchanger 4 as well as the channel plate 41 shown in FIGS. 8~8B are not used to limit the embodying of the heat exchanger for the high-temperature flow-splitting component of this disclosure. Practically, embodiments of the heat exchanger can be various but per requirements.

Referring to FIG. 7 and also FIG. 1~FIG. 4, by painting or coating a reforming catalyst coating onto any of the high-temperature flow-splitting components 1, 1A~1D, then a corresponding reforming mechanism can be formed to be suitable for the SOFC, for example, to perform reforming reactions such as a formation of $CO_2$ by carbon and hydrogen. In addition, the high-temperature tail exhaust gas can be utilized to reform the catalyst coating such as a Ni-base alloy, a Cu-base alloy and a precious metal like platinum Pt, for performing the reforming reaction of $CO_2$ with $CH_4$ or $H_2$, such that $CO_2$ emissions can be reduced and also the efficiency of power generation can be enhanced.

In accordance with this disclosure, specific channel arrangements as described above are defined to achieve flow splitting upon the high-temperature industrial gases. Through different diameter sizes and bifurcation designs, different flow resistance for different channels can thus be provided to obtain the desired flow-splitting performance.

The design logic of this disclosure is that, while the fluid passes through a curve surface, inertia effect would induce a separation phenomenon at the boundary layers, such that corresponding vortex would be generated to reduce the flow resistance. According to this disclosure, velocity and viscosity of the fluid would be also controlled by the work temperatures for varying the size of the vortex.

In summary, the high-temperature flow-splitting component provided by this disclosure utilizes various split channels at specific angling to control the flow resistance of the work fluid at different temperatures, such that the split percentage can be controlled.

In addition, according to this disclosure, beside the flow splitting at high temperatures for various industrial gases such as $H_2$, $CH_4$, CO, $CO_2$, $N_2$ and the air can be obtained, the existing components can be simultaneously integrated to pair a specific heat exchanger as a whole system with many advantages such as increase in heat recycling rates, controllability in flow split percentage, and reduction in system cost.

Empirically, to a power generation system, if 50% of the residual fuel can be reused, then the power-generation efficiency of the battery stack would be raised from 50% to 57%. When the power-generation efficiency is 50%, then an amount of 675-l/min nature gas is required. However, when the power-generation efficiency is 57%, then only 592-l/min nature gas is require. Namely, about 13% of the fuel cost can be saved. In other words, USD 20,000 for the fuel expense can be saved for an entire year. In comparison with the conventional technology that utilizes the temperature-resistant pumps to recycle the fuel gas and costs at least USD 50,000, the high-temperature flow-splitting component provided by this disclosure can perform much better and cost less.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A heat exchanger, comprising:
  at least one channel plate, having a first side and a second side to be furnished respectively and opposite to each other, a plurality of entrance holes and a plurality of exit holes, the plurality of entrance holes comprising a first entrance hole and a second entrance hole located oppositely diagonally to the first entrance hole, the plurality of exit holes comprising two first exit holes and a second exit hole located oppositely diagonally to the first exit holes, a plurality of first fluid channels being provided on the first side, and a plurality of second fluid channels being provided on the second side, a first fluid being to flow respectively from the first entrance hole to the two first exit holes through the plurality of first fluid channels, and a second fluid being to flow respectively from the second entrance hole to the second exit hole through the plurality of second fluid channels, the first fluid and the second fluid having different temperatures,
  wherein the plurality of first fluid channels are formed by a plurality of high-temperature flow-splitting components, and each of the plurality of high-temperature flow-splitting components comprises:
    a single entrance channel, used for introducing the first fluid at a total flow rate, wherein the entrance channel has an exit;
    a single primary channel, connected with the entrance channel, forming a first angle with the entrance channel, the first angle ranging from 90°~270°, wherein the primary channel has an entrance directly connected with the exit of the entrance channel, such that the first fluid completely flows into the primary channel from the entrance channel; and
    a single subordinate channel, connected with the primary channel, forming a second angle with the primary channel, the second angle ranging from 30°~150°, the subordinate channel has an entrance directly connected with the primary channel and not directly connected with the exit of the entrance channel, such that the first fluid in the primary channel flows distributedly into the subordinate channel and downstream in the primary channel;
    wherein at the entrance of the subordinate channel, the first fluid flowing downstream in the primary channel has a first flow rate, the first fluid flowing into the subordinate channel has a second flow rate, and a sum of the first flow rate and the second flow rate is equal to the total flow rate;
    wherein the entrance channel, the primary channel and the subordinate channel have different diameter sizes, the entrance channel, the primary channel and the subordinate channel collectively form an asymmetrical bifurcated structure with the different diameter sizes of the entrance channel, the primary channel and the subordinate channel, thereby providing different flow resistances for the entrance channel, the primary channel and the subordinate channel to obtain a specific flow-splitting performance, and controlling the flow resistances of the first fluid at different temperatures, such that a split percentage of each of the plurality of high-temperature flow-splitting components is controllable.

2. The heat exchanger of claim 1, wherein each of the at least one high-temperature flow-splitting component is applicable to operate under a temperature range between a first temperature and a second temperature larger than the first temperature, the first temperature is 25° C., and the second temperature is 800° C.

3. The heat exchanger of claim 1, wherein the primary channel has a first diameter $\psi 1$, the subordinate channel has a second diameter $\psi 2$, and $(\psi 2/\psi 1)=0.25\sim 1.1$.

4. The heat exchanger of claim 1, wherein the first angle is 270° and the second angle is 150°.

* * * * *